No. 631,186. Patented Aug. 15, 1899.
G. R. SHERWOOD.
MACHINE FOR REMOVING PITH FROM CORNSTALKS.
(Application filed Apr. 8, 1898.)

(No Model.) 6 Sheets—Sheet 1.

WITNESSES:
M. D. Blondel
P. B. Turpin

INVENTOR
G. R. Sherwood.
BY Munn & Co.
ATTORNEYS.

No. 631,186. Patented Aug. 15, 1899.
G. R. SHERWOOD.
MACHINE FOR REMOVING PITH FROM CORNSTALKS.
(Application filed Apr. 8, 1898.)
(No Model.) 6 Sheets—Sheet 2.

WITNESSES: INVENTOR
G. R. Sherwood.
BY
ATTORNEYS.

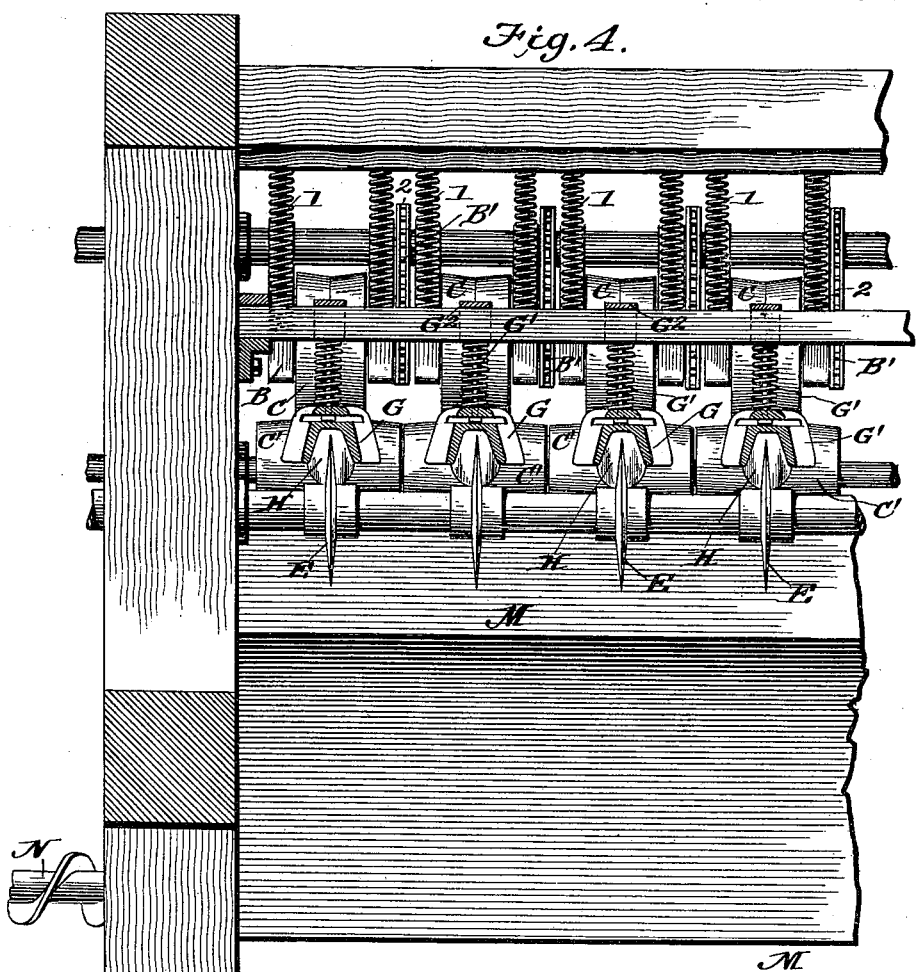
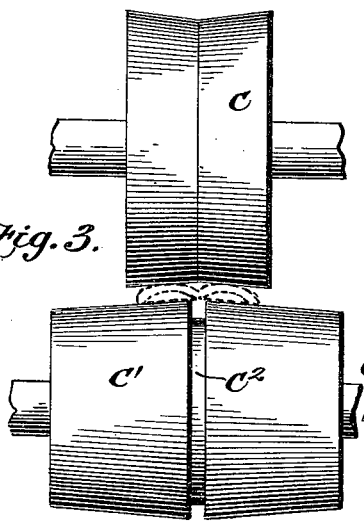

No. 631,186. Patented Aug. 15, 1899.
G. R. SHERWOOD.
MACHINE FOR REMOVING PITH FROM CORNSTALKS.
(Application filed Apr. 8, 1898.)

(No Model.) 6 Sheets—Sheet 4.

WITNESSES:
M. L. Bloudel.
P. B. Turpin.

INVENTOR
G. R. Sherwood.
BY Munn & Co.
ATTORNEYS.

No. 631,186. Patented Aug. 15, 1899.
G. R. SHERWOOD.
MACHINE FOR REMOVING PITH FROM CORNSTALKS.
(Application filed Apr. 8, 1898.)
(No Model.) 6 Sheets—Sheet 5.
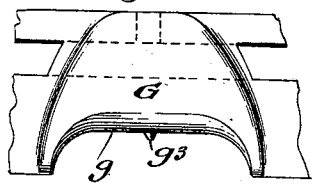
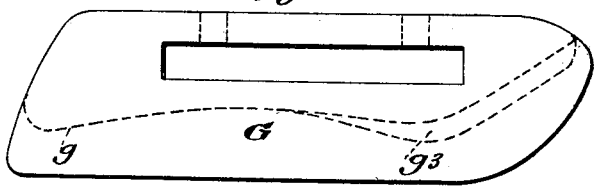
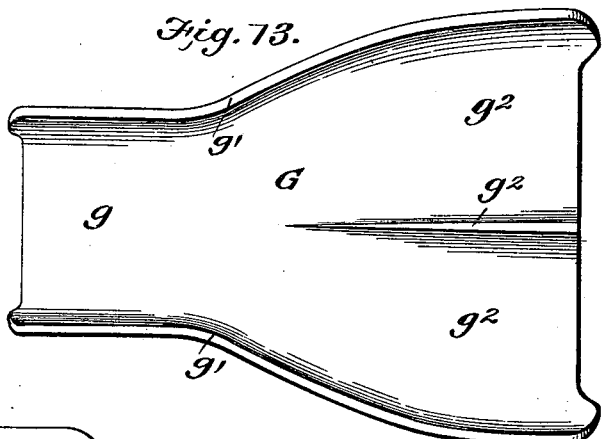
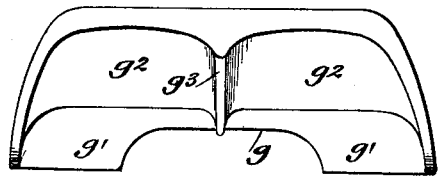
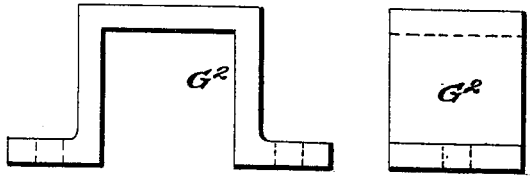
WITNESSES:
M. S. Blondel
P. B. Turpin
INVENTOR
G. R. Sherwood.
BY Munn & Co.
ATTORNEYS.

No. 631,186. Patented Aug. 15, 1899.
G. R. SHERWOOD.
MACHINE FOR REMOVING PITH FROM CORNSTALKS.
(Application filed Apr. 8, 1898.)
(No Model.) 6 Sheets—Sheet 6.
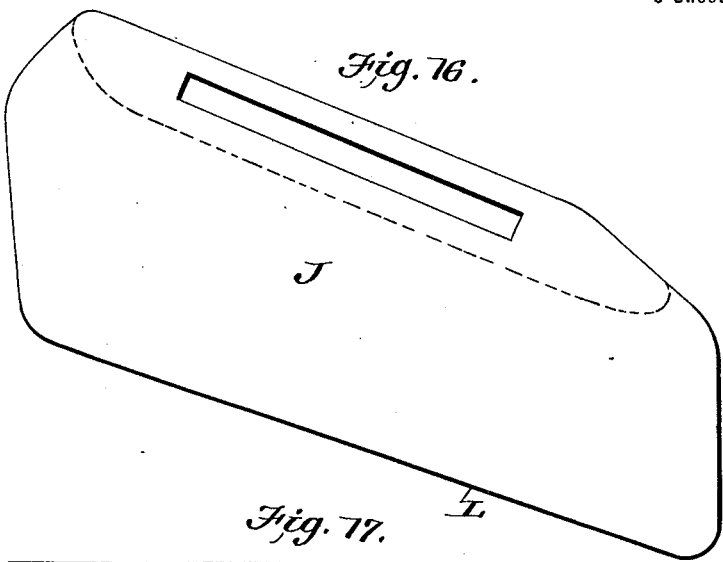
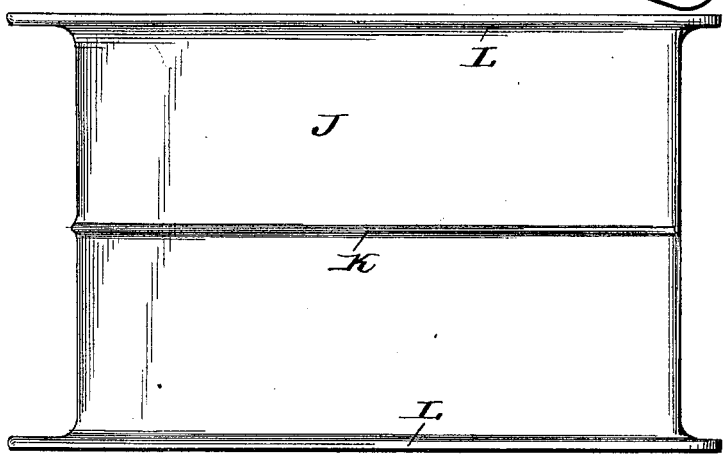
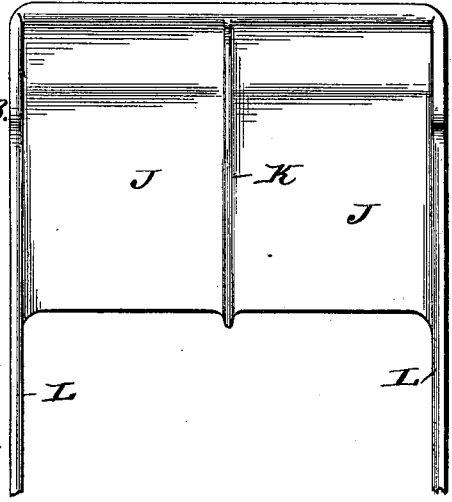
WITNESSES:
INVENTOR
G. R. Sherwood.
BY
ATTORNEYS.

UNITED STATES PATENT OFFICE.

GEORGE R. SHERWOOD, OF KEARNEY, NEBRASKA.

MACHINE FOR REMOVING PITH FROM CORNSTALKS.

SPECIFICATION forming part of Letters Patent No. 631,186, dated August 15, 1899.

Application filed April 8, 1898. Serial No. 676,889. (No model.)

*To all whom it may concern:*

Be it known that I, GEORGE R. SHERWOOD, a resident of Kearney, in the county of Buffalo and State of Nebraska, have invented certain new and useful Improvements in Machines for Removing Pith from Cornstalks, of which the following is a full, clear, and exact specification.

My invention is an improvement in machines for removing pith from cornstalks, and has for an object, among others, to furnish improvements in the feeding devices, in the devices for guiding the stalks to the cutting devices, in the means for holding the stalks to the cutting devices, in the means for directing the stalks to the pith-removing devices, in the means for holding the stalks to the pith-removing devices, and in certain other features, as will be hereinafter described.

The invention consists in certain novel constructions and combinations of parts, as will be hereinafter described, and pointed out in the claims.

Figure 1:
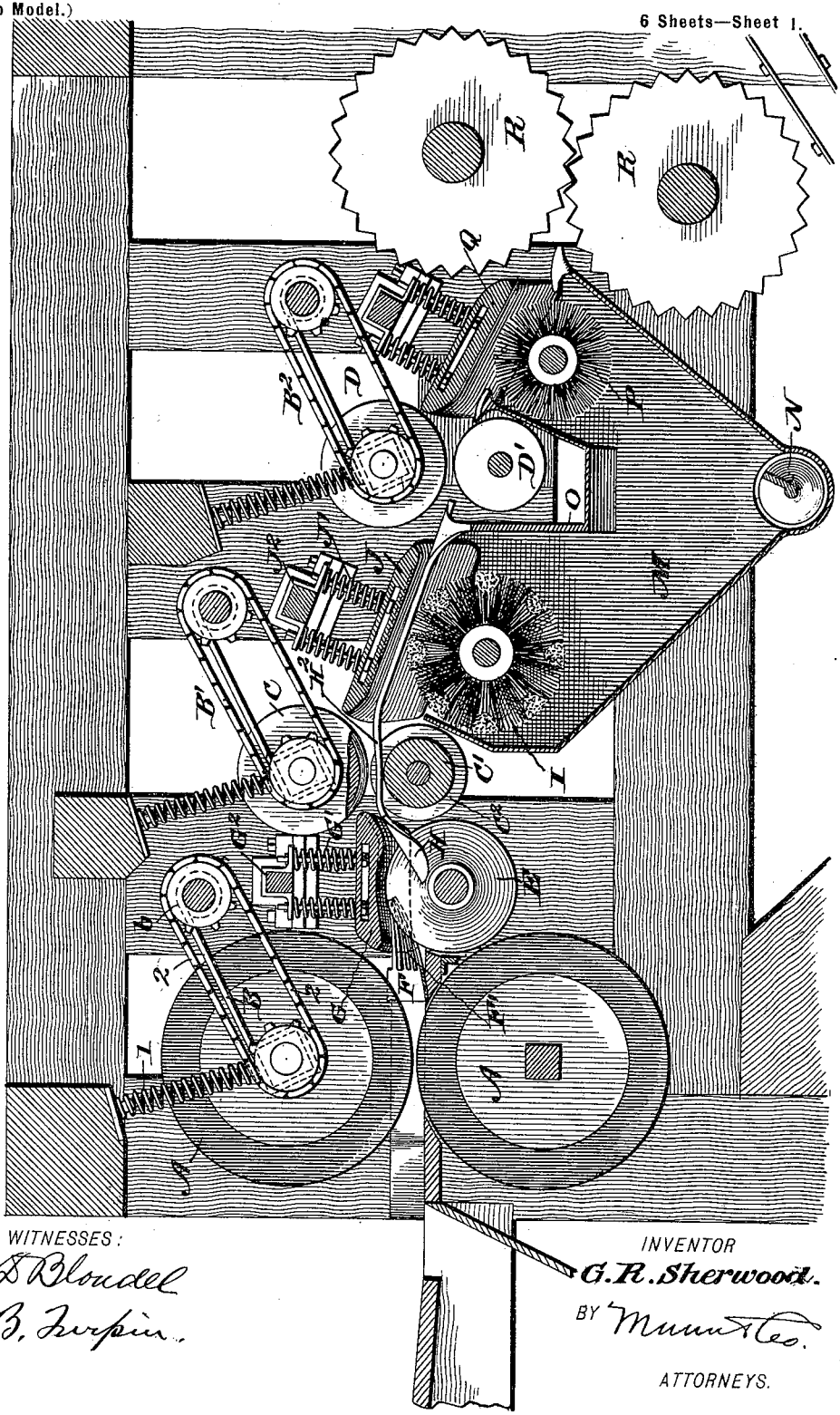
Figure 2:
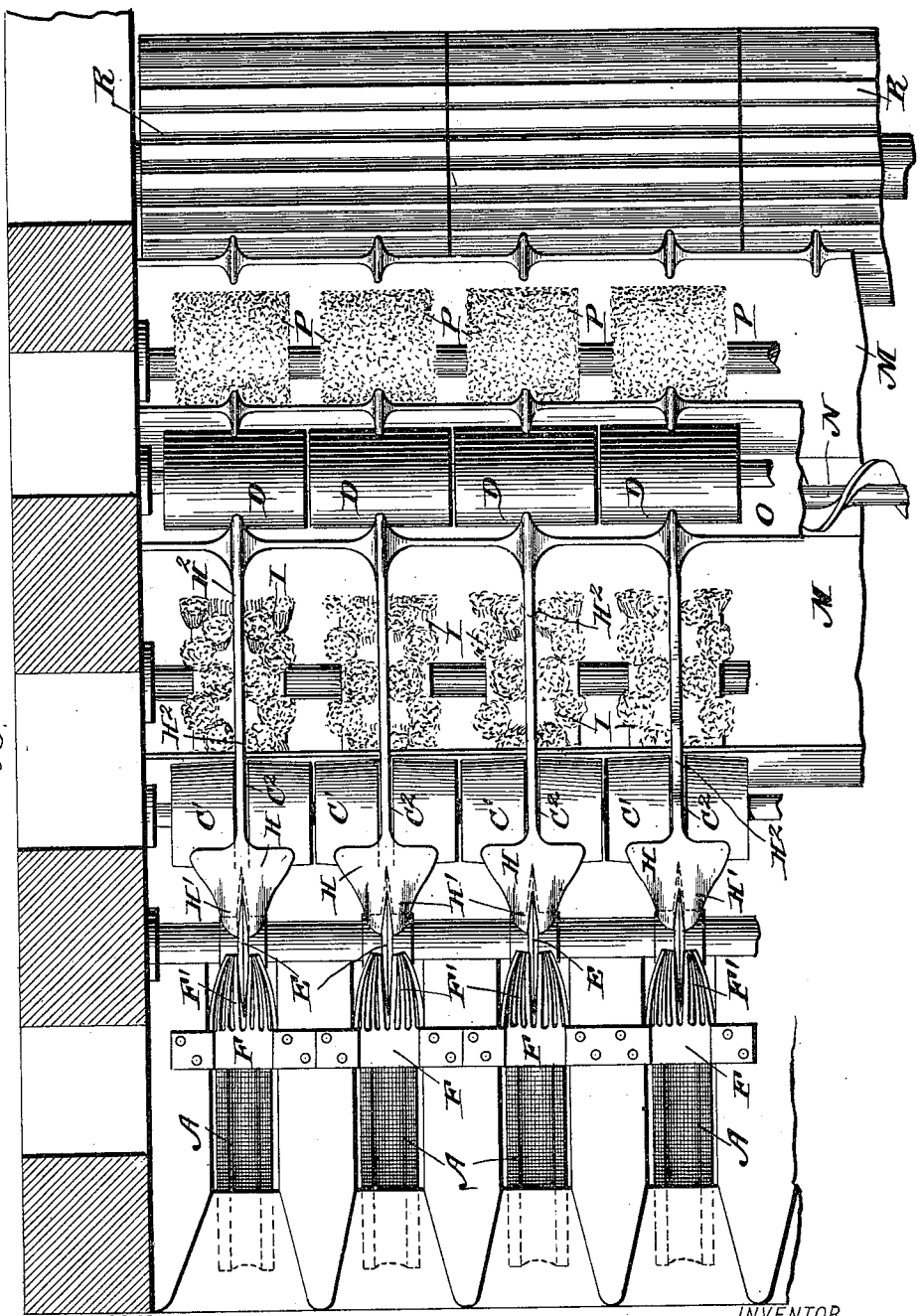
Figure 5:
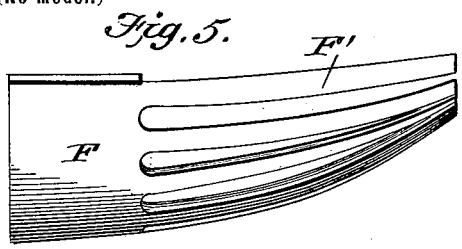
Figure 6:
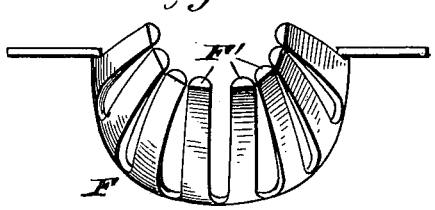
Figure 7:
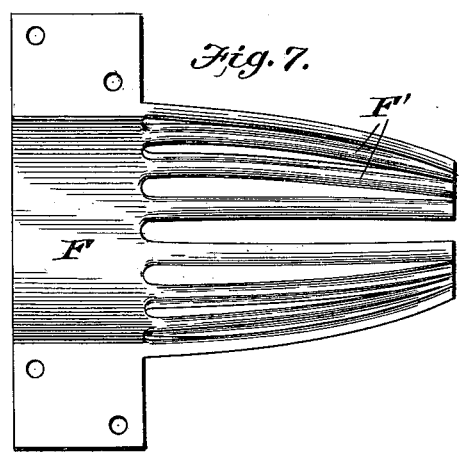
Figure 8:
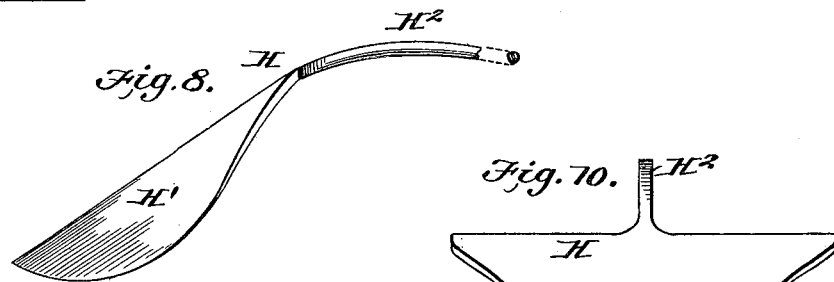
Figure 10:
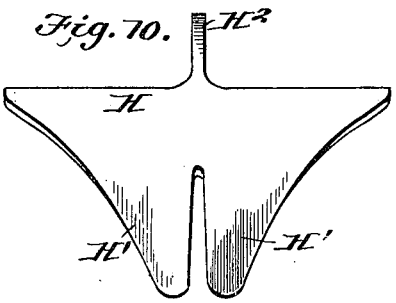
Figure 9:
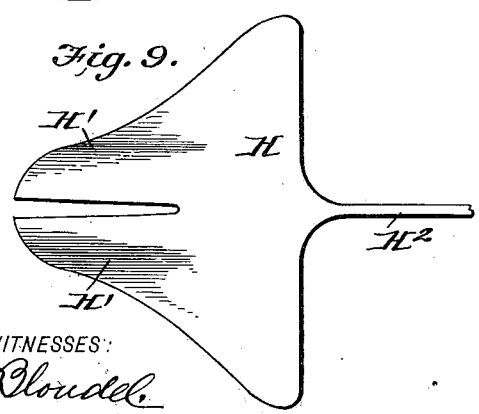

In the drawings, Figure 1 is a vertical longitudinal section of my improved machine. Fig. 2 is a sectional plan view thereof, parts being removed and others shown in section. Fig. 3 is a detail elevation of the feed-rollers intervening the splitting and brushing devices. Fig. 4 is a transverse section on about line 4 4 of Fig. 1. Figs. 5, 6, and 7 are respectively side, rear end, and top plan views of the guide for directing the stalk to the splitting devices. Figs. 8, 9, and 10 are respectively side, top plan, and front elevation of the saddle which receives the stalk from the splitting devices. Figs. 11, 12, 13, and 14 are respectively front, side, bottom plan, and rear end views of the presser which coöperates with the splitting device. Fig. 15 illustrates in detail the holding and bearing clip for springs which actuate the pressers. Figs. 16, 17, and 18 are respectively side, bottom plan, and front views of the presser which coöperates with the pith-removing device.

In connection with a suitable framing I provide means for directing the stalks to the feed-rollers A A, the upper one of which is supported in a frame B, which is pivoted at its rear end $b$, carries the roller A at its front end, being actuated at such end by a spring 1, which presses the front end of the frame B down and aids the gravity of such wheel in feeding the stalks to the splitting devices. The upper roller A is driven by a belt 2 from the drive-shaft coincident with the pivot $b$. Similar frames $B'$ and $B^2$ and actuating-springs and guide devices are used in connection with feed-rollers C and D, as presently described and which need not be further described in detail.

The rollers A feed the stalks to the splitting-disks E, and in connection with the feeding devices and splitting-disks I furnish a centering device, which directs the stalk properly to the splitting-disk, so the latter will subdivide the stalks with comparative accuracy, in order that the halves of the stalk which are presented to the removing devices may be practically similar. This centering device F is shown in Figs. 1 and 2 and in detail in Figs. 5, 6, and 7 and consists in the construction shown of a series of fingers uniting at their base or front ends with a plate, which is concaved on its upper side and presents practically a semicircular form, the fingers curving inward and upward toward their rear ends and presenting at such end the arc of a reduced circle, which is subdivided radially by the splitting-disk. These fingers $F'$ are springy or resilient, and so conform to stalks of different sizes and yielding equally tend to properly center the stalks and direct them to the splitting-disk so the latter will divide the stalk into similar sections.

In my present invention it is not my purpose to split the stalk entirely through, although such result will frequently ensue, but I purpose leaving the stalk at one side unsplit, so the two stalk-sections will be connected, this connection being preferably at the top of the divided stalk, as will be understood from the drawings. To this end I arrange the splitting-disk and its presser-shoe G so the latter will not force the stalk entirely to the cutting-disk, but will permit the upper portion of the stalk to ride clear of the disk and so be left uncut. This will be understood from Fig. 1, which shows the shoe G in its normal position and spaced partly away from the disk E. It is preferred to only partly subdivide the stalk without disconnecting its sections, because thereby each section tends to hold the other in position during the subsequent treatment of the stalk and to aid in properly guiding the stalk-sections, which are connected as before described.

After the stalk is split by the disk E it is received by the saddle H, which has at its front end downwardly and laterally inclined wings H', extending on opposite sides of the disk E and sloping upward toward their rear ends, where they deliver the stalk-sections to the feed-rollers C and C'. The presser-shoe G coöperates with the centering feeding device F, the disk E, and the saddle H, and extends over the disk E and projects at its front end over the fingers F' and at its rear end over the inclined wings of the saddle H. This shoe G is shown in detail in Figs. 11, 12, 13, and 14 and is supported by springs G', arranged one in advance and the other in rear of the middle of said shoe, so the front and rear ends of said shoe are held yieldingly independent of each other. By this means both springs tend to hold the shoe to its place and either end may yield without respect to the other, as will be understood from Fig. 1. At their upper ends the springs G' bear against the clip $G^2$, as shown.

In their under sides the shoes G are recessed to receive the stalks, being narrowed at their front ends, as shown at $g$, and widening at $g'$ between their ends into the wings $g^2$, which wings $g^2$ are separated by a central longitudinal rib $g^3$. The walls of the wings $g^2$ incline upward toward their rear ends on lines practically parallel with the line of the upper edge of the wings H', and the rib $g^3$ by bearing upon the portion which connects the two stalk-sections operates to properly aid in directing such central portion of the stalk upon the bar $H^2$ of the saddle, which leads rearwardly from the wings H' and forms a support for the stalk as its sections are presented for the action of the pith-removing wheel or brush I.

The rollers C and C' lie between the splitting-disk and the pith-removing device and are of a special form. (Best shown in Fig. 3.) From such Fig. 3 it will be noticed that the roller C' has at its center a groove $C^2$, which receives the saddle-bar $H^2$, is made largest at its center and gradually decreases in diameter toward its end. The roller C conforms to its mate C', being made smallest at its center and gradually increasing in diameter toward its ends, the two rollers C and C' being spaced slightly apart to receive the stalk, as indicated in Fig. 3, and to conform to such stalk, as shown in said figure. In rear of the rollers C and C', I arrange the pith-removing wheel I below the rear end of the saddle-bar $H^2$, such wheel I being adapted to remove the pith from the sections of the stalk which straddles the bar $H^2$, as will be understood from Fig. 1. The stalk is held to the pith-removing brush by the presser-shoe J, which has on its under side the central rib K, which bears above the bar $H^2$ and has at its edges the depending flanges L, which prevent any lateral displacement of the stalk while being acted on by the pith-removing device. This shoe J is actuated by springs J', supported by a clip $J^2$ and similarly arranged to the parts G' and $G^2$ before described. The brush I, which may be of any suitable brushing material, throws the pith out of the stalk-sections into the drum M, whence it is removed by a screw-conveyer N or otherwise, as may be desired. In said drum in rear of the wheel I, I provide a casing O, whose front end connects with the rear end of the saddle-bar $H^2$ and which receives the roller D', which coöperates with the upper feed-roller D in directing the stalks to a brush P, which has a presser-shoe Q spring-actuated in similar manner to the shoes J and G before described. The brush P also discharges into the drum M, and the purpose of such brush is to finish removing any particles of pith that may be left in the stalk-sections after they have been acted on by the brush I. It will be understood that this brush P may be omitted when desired, as ordinarily the brush I will be thoroughly effective, but in some instances it may be desirable to use the brush P to secure a rebrushing of the stalk-sections. So far as I am informed it is a new departure in the art to subject the pith in the stalks to a final or finishing action after the main pith-removing operation.

In the operation of my machine the stalks are received by the feed-rollers A, fed thence to the centering device F, directed thereby to the splitting-disk E, being held properly in contact with the disk E by the shoe G. This disk E divides the stalk almost into two sections, which are directed by the wings H' of the saddle to the feed-rolls C and C', beyond which the stalk riding on the saddle-bar $H^2$ is acted on by the pith-removing brush I, being held for such action by the shoe J and the saddle-bar $H^2$, before described. The feed-rolls D and D' then direct the stalk-sections, from which the major portion of the pith has been removed, to the finishing-brush P, whence the stalk passes to the crushing-rolls R and out of the machine.

The operation is simple and effective, and means are provided throughout the machine whereby the stalk is properly directed to and held for the operation of the splitting and pith-removing devices, and the guiding and holding devices may readily accommodate themselves to stalks of different sizes.

Having thus described my invention, what I claim, and desire to secure by Letters Patent, is—

1. The combination of the disk the saddle having plates extending on opposite sides of the disk and inclined upwardly from their front ends and the presser-shoe having at its rear end an inclined portion corresponding to said saddle-plates substantially as set forth.

2. The combination of the disk, the centering device having fingers converging toward said disk, the saddle having inclined plates on opposite sides of the disk the presser-shoe arranged above the disk and extending at its opposite ends over said fingers and saddle-plates and means for yieldingly supporting said shoe substantially as set forth.

3. The combination in a machine substantially as described of a cutter arranged to partially subdivide the stalk, devices for feeding the stalk, and a saddle-bar extending rearwardly from the cutter and adapted to support the split stalk and pith-removing devices substantially as set forth.

4. In a machine substantially as described the combination of a pith-removing wheel a saddle-bar extended above the same and adapted to be straddled by a partially-divided stalk and a shoe by which to press the stalk onto said saddle-bar and into position to be acted on by the pith-removing wheel substantially as set forth.

5. The combination of the pith-removing wheel a saddle-bar extended longitudinally thereover and adapted to be straddled by the partially-split stalk and a presser-shoe extended over said saddle-bar and having above the same a longitudinal rib substantially as set forth.

6. The combination of the cutter, the saddle having inclined plates on opposite sides of the cutter and leading rearwardly therefrom, the saddle-bar extending from said plates, the pith-removing wheel below the saddle-bar, and the feed-rolls between said wheel and the cutter, one of such rolls being grooved for the passage of the saddle-bar substantially as set forth.

7. The combination of the cutting-disk, the pith-removing wheel in rear thereof, the saddle having inclined plates extending on opposite sides of the disk and a saddle-bar extended rearwardly over the pith-removing wheel the presser-shoe operating above the disk, and the presser-shoe operating above the pith-removing wheel and over the saddle-bar substantially as set forth.

8. The combination with a splitting device and a pith-removing device of a saddle having a bar extended longitudinally over the pith-removing device and inclined plates or wings leading to such bar and arranged on opposite sides thereof and adjacent to the splitting device substantially as set forth.

9. The combination substantially as described of the splitting-disk, the centering device having spring-fingers converging toward said disk, a saddle having inclined wings on opposite sides of said disk and a saddle-bar extended rearwardly from said wings, the presser-shoe arranged over the disk and extended at its ends over the fingers and inclined wings, the pith-removing device operating below the saddle-bar, and the presser-shoe coöperating with said saddle-bar and pith-removing device substantially as set forth.

10. In a machine substantially as described the combination of the framing, the pith-removing device, the hopper or receptacle arranged to receive the pith removed by said device the finishing-brush also arranged to discharge the pith into said hopper or receptacle, the casing arranged in said receptacle between the pith-removing device and the finishing-wheel, the feed-roll operating in said casing, and its coöperating feed-roll substantially as set forth.

11. A machine substantially as described comprising means whereby to partially split the stalk lengthwise, a pith-removing device in rear of said splitting device and a saddle-bar extended between said devices in position to be straddled by and support the partially-divided stalk while it is being acted on by the pith-removing devices substantially as set forth.

12. The combination of the cutting-disk, the saddle having plates on opposite sides of said disk and inclining upward in a rearward direction from said disk, the presser-shoe overlying said disk and saddle and having on its under side an upwardly-inclined surface coinciding with the upwardly-inclined portions of the saddle-plates and yielding supports for said presser-shoe substantially as set forth.

GEORGE R. SHERWOOD.

Witnesses:
  SOLON C. KEMON,
  P. B. TURPIN.